Aug. 27, 1935.  C. N. TEETOR  2,012,324
PISTON RING
Filed Aug. 4, 1930
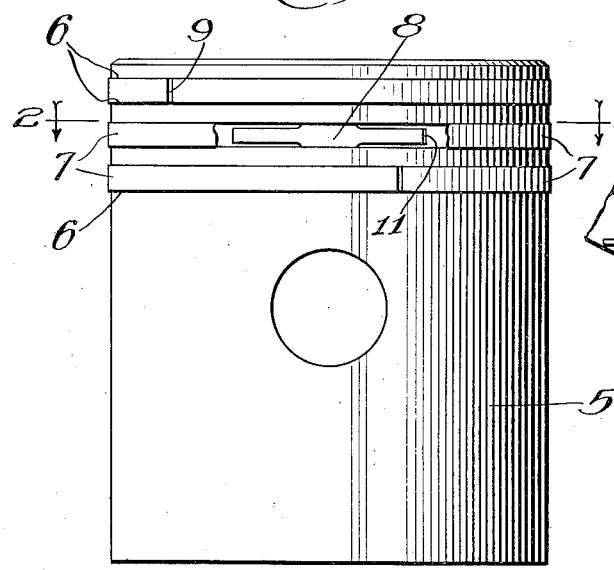
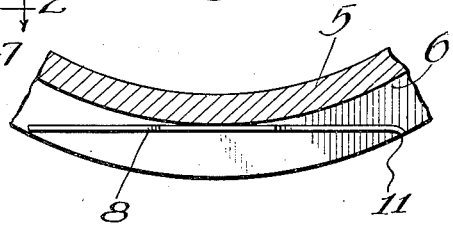
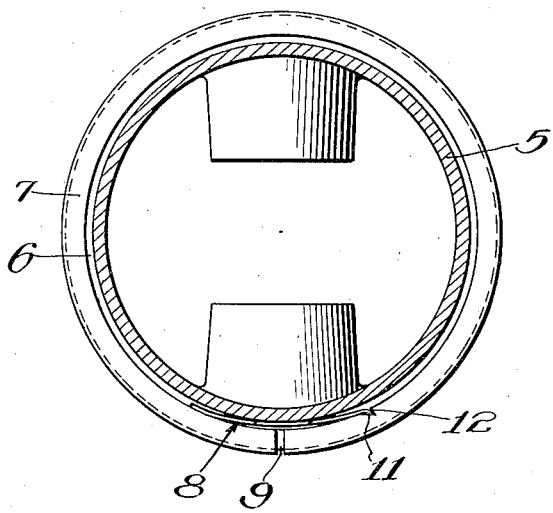
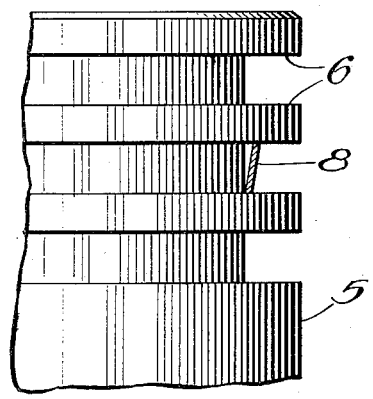
Inventor:
Charles N. Teetor Patented Aug. 27, 1935

2,012,324

UNITED STATES PATENT OFFICE 2,012,324

PISTON RING

Charles N. Teetor, Hagerstown, Ind., assignor to The Perfect Circle Company, Hagerstown, Ind., a corporation of Indiana Application August 4, 1930, Serial No. 472,824

3 Claims. (Cl. 309—41)

This invention relates to piston rings for internal combustion engines and the like.

One of the principal objects of my invention is to provide novel means for expanding the free ends of a split resilient piston ring.

Another object of my invention is to provide a novel device for preventing a piston ring from rotating in its groove in the piston.

A still further purpose of my invention is to accomplish both of the above-mentioned functions by a single device which is cheap in cost, simple in design and easy of application.

Other objects and advantages will become apparent as this description progresses and by referring to the accompanying drawing wherein:

Fig. 1 is a side elevation of a piston showing one of the piston rings broken away to disclose the device embodying my invention more clearly to view.

Fig. 2 is a cross section taken through the piston as on the line 2—2 of Fig. 1.

Fig. 3 is a detailed fragmentary cross section showing the condition of my device before the piston ring is placed in the piston groove, and Fig. 4 is a fragmentary view of part of the piston and illustrates my device before it is forced into flush engagement with the back of the groove.

I have shown a piston 5 which may be of any desirable form. Mounted in the piston ring grooves 6 are the piston rings 7, the middle one of which is shown broken away in Fig. 1 to disclose to view an expanding and retaining clip 8. As illustarted in Fig. 2, the resilient piston ring is made of one piece and has the usual gap or split 9 which may be of any desired form.

The spring clip 8 preferably consists of a thin piece of spring steel which is widest at its central portion so that at this portion it is slightly wider than the width of the ring groove 6 in which it is being inserted. One end of the clip 8 is bent outwardly to form a detent 11 adapted to engage in a recess 12 formed in the inner or back face of the ring.

When applying the clip to the piston it is first placed in the position illustrated in Fig. 4 and its center is then given a sharp blow to force it home to its vertical position, flush against the back face of the groove as shown in Fig. 3. In this position the clip is tightly wedged between the flat sides of the groove and firmly held against displacement. The piston ring is then inserted in the groove so that the detent 11 engages in the notch 12, as shown in Fig. 3, the clip thus serving to prevent rotation of the ring in the groove.

The piston ring causes the clip to become bowed laterally and as the clip tends to assume its normal position it exerts an outward resilient pressure on the adjacent free ends of the ring thus insuring that they properly contact with the cylinder wall.

Because of the character of a split resilient piston ring, its ends, in many instances, do not exert the same degree of pressure against the cylinder wall as the remainder of the ring, and this results in excessive "blow-by" and oil consumption and other defects seriously impairing the efficiency of the engine. My invention overcomes this difficulty as the spring clip supplements the inherent expansive pressure of the ring so that the portions of ring adjacent the gap or split exert substantially the same pressure against the cylinder wall as the remainder of the ring, the pressure then being substantially uniform throughout the diameter of the ring.

The clips 8 in the several ring grooves are placed in staggered vertical relation so that the gaps or splits in the rings are held out of vertical alignment, thus reducing leakage through the gaps.

While I have shown only one form of my invention, it will be understood that various changes in details and arrangement of parts may be made without departing from the spirit and scope of my invention as defined in the claims which follow.

I claim:

1. In combination with a piston having a comparatively shallow piston ring groove of substantially uniform depth a resilient one-piece piston ring having a gap causing free ends, and a one-piece spring clip having a central body portion of substantially the width of said groove for tightly fitting therein and arms of less width fitting freely in said groove and extending away from said body portion into engagement with the ends of the ring on opposite sides of said gap, one of said arms being non-rotatably engaged with the ring, the remainder of said groove being unobstructed whereby the ring except at its free ends expands under its own normal pressure.

2. In combination with a piston having a piston ring groove, a piston ring therein having a gap, and a spring strip having a widened central portion and narrow free ends, the widened portion being wedged between the sides of the groove to hold it flush against the back of the groove and against displacement and the free ends being in engagement with the ring on either side of the gap to expand the ring.

3. In combination with a piston having a piston ring groove, a piston ring therein having a gap and a recess in its back face, and a spring strip having a widened central portion and narrow free ends, the widened portion being wedged between the sides of the groove to hold it flush against the back of the groove and against displacement and the free ends being in engagement with the ring on either side of the gap to expand the ring, one end of said strip being bent to engage in said recess to prevent rotation of the ring.

C. N. TEETOR.